(12) United States Patent
Usami

(10) Patent No.: US 11,258,353 B2
(45) Date of Patent: Feb. 22, 2022

(54) POWER CONVERTER

(71) Applicant: TOSHIBA TEC KABUSHIKI KAISHA, Tokyo (JP)

(72) Inventor: Yutaka Usami, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/912,848

(22) Filed: Jun. 26, 2020

(65) Prior Publication Data

US 2021/0184566 A1 Jun. 17, 2021

(30) Foreign Application Priority Data

Dec. 16, 2019 (JP) .............................. JP2019-226373

(51) Int. Cl.
*H02M 1/42* (2007.01)
*G05F 1/70* (2006.01)
*H02M 3/335* (2006.01)

(52) U.S. Cl.
CPC ..... *H02M 1/4225* (2013.01); *H02M 3/33592* (2013.01); *G05F 1/70* (2013.01); *H02M 1/4208* (2013.01); *H02M 1/4241* (2013.01); *H02M 1/4258* (2013.01); *H02M 1/4283* (2021.05)

(58) Field of Classification Search
CPC ............. H02M 1/4208; H02M 1/4241; H02M 1/4258; H02M 1/4283; G05F 1/70
USPC .............................. 323/207; 363/89, 126, 127
See application file for complete search history.

(56) References Cited

U.S. PATENT DOCUMENTS

| | | | | |
|---|---|---|---|---|
| 4,644,458 | A * | 2/1987 | Harafuji | H04B 3/44 363/65 |
| 5,978,243 | A * | 11/1999 | Ishii | H02M 1/4208 363/89 |
| 10,122,262 | B1 * | 11/2018 | Wang | G05F 1/70 |
| 2012/0257315 | A1 * | 10/2012 | Wallmeier | H02H 3/162 361/45 |
| 2013/0077365 | A1 * | 3/2013 | Chalermboon | H02M 1/4208 363/89 |
| 2014/0035541 | A1 * | 2/2014 | Jin | H02M 3/156 323/210 |
| 2015/0180330 | A1 * | 6/2015 | Ye | H02M 1/4225 363/126 |
| 2016/0285353 | A1 * | 9/2016 | Kim | H03K 17/302 |
| 2016/0373021 | A1 * | 12/2016 | Gonthier | H02M 7/217 |
| 2017/0033706 | A1 * | 2/2017 | Usami | H02M 1/4225 |
| 2017/0070157 | A1 * | 3/2017 | Tsukii | H02M 1/4225 |
| 2017/0302150 | A1 * | 10/2017 | Takayama | H02M 1/08 |
| 2018/0026520 | A1 * | 1/2018 | Hirota | H02M 3/335 363/21.01 |

FOREIGN PATENT DOCUMENTS

| | | |
|---|---|---|
| JP | 2016-152655 | 8/2016 |
| JP | 2017-195736 | 10/2017 |

* cited by examiner

*Primary Examiner* — Gary A Nash
(74) *Attorney, Agent, or Firm* — Amin, Turocy & Watson, LLP

(57) ABSTRACT

According to one embodiment, there is provided a power converter including a totem-pole power factor correction circuit that can achieve reduction in recovery loss with a simple structure. A power converter according to an embodiment includes a totem-pole power factor correction circuit, a series connection of a first current detector and a second current detector, and a control circuit.

17 Claims, 8 Drawing Sheets

POWER CONVERTER

CROSS-REFERENCE TO RELATED APPLICATION

This application is based upon and claims the benefit of priority from Japanese Patent Application No. P2019-226373, filed on Dec. 16, 2019 the entire contents of which are incorporated herein by reference.

FIELD

Embodiments described herein relate to a power converter and a power conversion method.

BACKGROUND

A power converter converts an alternating current (AC) voltage obtained from an AC power supply into a direct current (DC) voltage and supplies power to a load. When converting the AC voltage of the AC power supply into the DC voltage, converting an AC current flowing through the AC power supply into a sine wave having the same phase as the AC voltage has the highest power factor and generates less harmonic noise. For example, the power converter includes a totem-pole power factor correction circuit (PFC) that makes an input current sinusoidal.

In order to control the totem-pole PFC as described above, it is necessary to detect an AC current that is flowed by an incoming AC voltage. For example, a power converter including a current transformer for detecting a current has been put to practical use. However, in such a configuration, the detection result of the AC current is output as a positive or negative signal. For this reason, the detection result of current cannot be directly used for a control IC that controls the totem-pole PFC. Therefore, it is necessary to convert the detection result of current into a signal referenced to any GND, that is, to insulate the signal, and there is a problem that the circuit is complicated. Further, since the current transformer is expensive, there is a problem that the cost increases.

DETAILED DESCRIPTION

The problem to be solved by the present disclosure is to provide a power converter including a totem-pole PFC capable of high efficiency power conversion with a simple configuration.

In general, according to one embodiment, there is provided a power converter including a totem-pole power factor correction circuit, a series connection of a first current detector and a second current detector, and a control circuit. The totem-pole power factor correction circuit includes a coil connected to a first terminal of an AC power supply, a first half-wave switch having a source terminal connected to the coil, a second half-wave switch having a drain terminal connected to the source terminal of the first half-wave switch, a first diode having a cathode connected to the drain terminal of the first half-wave switch and an anode connected to a second terminal of the AC power supply, a second diode having an anode connected to a source terminal of the second half-wave switch and a cathode connected to the second terminal of the AC power supply, and a smoothing capacitor connected between the cathode of the first diode and the anode of the second diode. A series connection of the first current detector and the second current detector is connected between the anode of the first diode and the cathode of the second diode, and the second terminal of the AC power supply. The control circuit is configured to perform the pulse width control for turning on and off the first half-wave switch and the second half-wave switch based on a detection result of current by the first current detector or a detection result of current by the second current detector.

Hereinafter, embodiments will be described with reference to the drawings.

Figure 1:
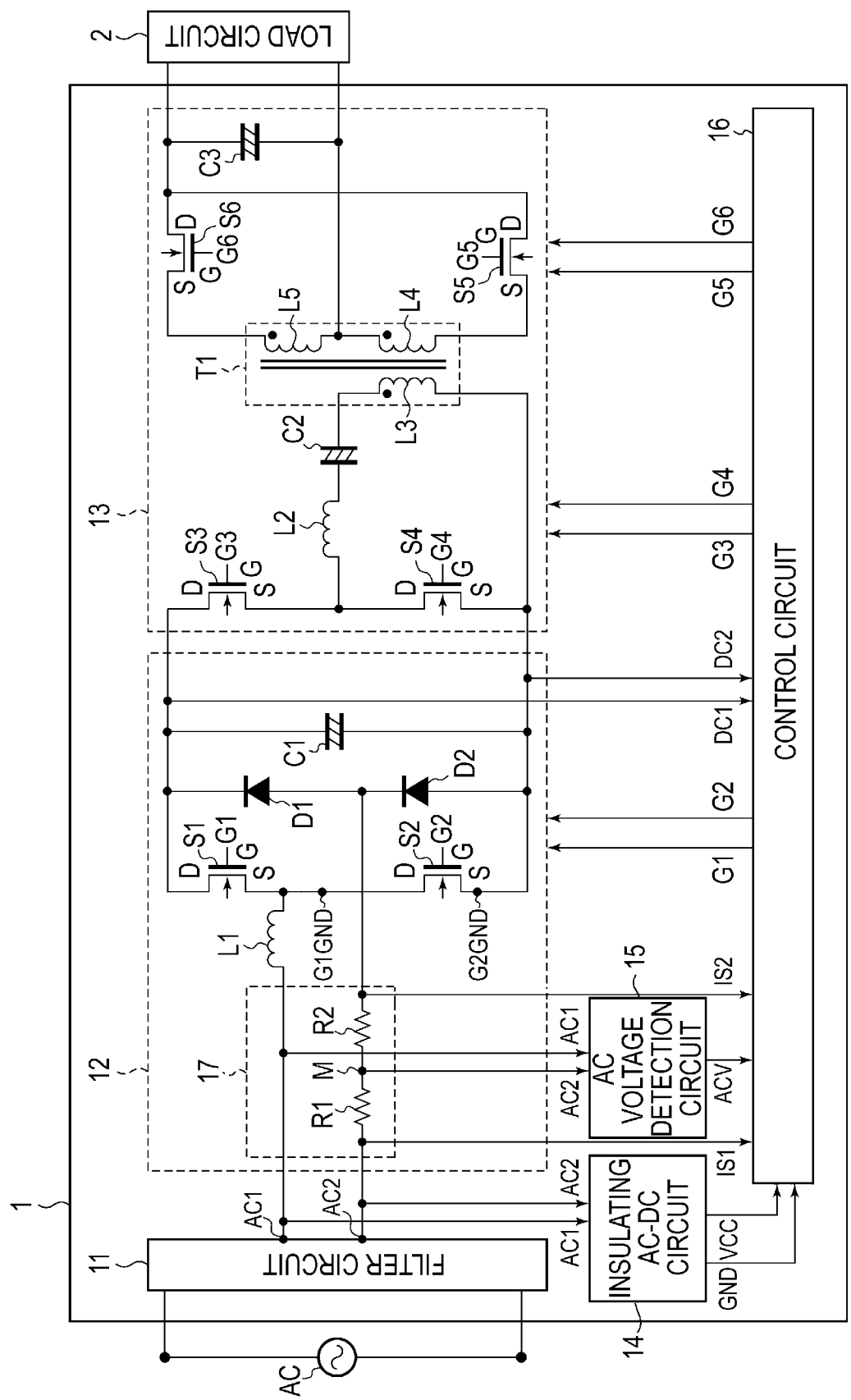
FIG. 1 is a diagram for explaining an example of a configuration of a power converter according to an embodiment.

FIG. 1 is a diagram illustrating an example of a configuration of a power converter 1 according to an embodiment. The power converter 1 includes a totem-pole PFC. The power converter 1 including the totem-pole PFC is connected to an AC power supply AC which is an input power supply. The power converter 1 switches AC voltage of an AC power supply AC at a high frequency to output DC power to a load circuit 2, so that the load circuit 2 is operated. For example, AC voltage is low frequency 50 Hz LLC unit 13 is high frequency 100 kHz switching DC to DC converter DC output voltage is zero frequency (DC.

First, the configuration of the power converter 1 will be described. The power converter 1 includes a filter circuit 11, a totem-pole PFC 12, an LLC resonance circuit 13, an insulating AC-DC circuit 14, an AC voltage detection circuit 15, and a control circuit 16.

The filter circuit 11 serves to filter out a noise leakage from the power converter 1 to the AC power supply AC. For example, the filter circuit 11 is an EMC filter. The filter circuit 11 receives an AC voltage having a commercial frequency component of 50 Hz from an input terminal and outputs the AC voltage from an output terminal. A high frequency noise, which is generated at the power converter 1 and transmitted to the output terminal. Input terminal, the noise transmits from unit 1 to input terminal AC1, AC2 is cut off by the filter circuit 11 and not transmitted to the input terminal. In addition, the filter circuit 11 includes a first terminal AC1 and a second terminal AC2 which are output terminals. That is, an AC power is output from the first terminal AC1 and the second terminal AC2.

The totem-pole PFC 12 converts an AC voltage obtained from the AC power supply AC through the filter circuit 11 into a boosted DC voltage and supplies the DC voltage to the LLC resonance circuit 13. The totem-pole PFC 12 boosts the voltage to a DC voltage greater than the peak value of the AC voltage. Thus, the totem-pole PFC 12 may control the AC current to have a sine wave. For example, the totem-pole PFC 12 boosts the AC voltage to a DC voltage of 400 V. Thus, the totem-pole PFC 12 may control the current even when the AC voltage is 90 to 256 V. That is, the totem-pole PFC 12 may configure a power converter that can be used worldwide.

The totem-pole PFC 12 includes a first coil L1, a first half-wave switch S1, a second half-wave switch S2, a first diode D1, a second diode D2, a first smoothing capacitor C1, a first resistor R1, and a second resistor R2.

The first coil L1 is connected through the filter circuit 11 to a first terminal of the AC power supply AC. For example, the first coil L1 is connected to the first terminal AC1 of the filter circuit 11.

The first half-wave switch S1 and the second half-wave switch S2 are switch elements that are turned on and off according to the control of the control circuit 16. The first half-wave switch S1 and the second half-wave switch S2 are formed of a wide bandgap semiconductor such as SiC, GaN, gallium oxide, or diamond, for example. An element formed of such a semiconductor has a higher switching speed and less floating capacitance between a drain and a source than a MOSFET formed of silicon, and thus has a smaller switching loss.

The first half-wave switch S1 is turned on and off according to a gate signal G1 supplied from the control circuit 16. The second half-wave switch S2 is turned on and off according to a gate signal G2 supplied from the control circuit 16.

The first half-wave switch S1 has a source terminal connected to the first coil L1. The second half-wave switch S2 has a drain terminal connected to the source terminal of the first half-wave switch S1.

The first diode D1 has a cathode connected to a drain terminal of the first half-wave switch S1, and an anode connected to the second terminal of the AC power supply AC through the filter circuit 11. The second diode D2 has an anode connected to a source terminal of the second half-wave switch, and a cathode connected to the anode of the first diode D1.

The first smoothing capacitor C1 is connected between the cathode of the first diode D1 and the anode of the second diode D2. A positive terminal of the first smoothing capacitor C1 and a negative terminal of the first smoothing capacitor C1 configure output terminals of a high-voltage DC output of the totem-pole PFC 12. In addition, the positive terminal and the negative terminal of the first smoothing capacitor C1 are connected to the control circuit 16, respectively. In addition, a signal DC1 corresponding to the potential of the positive terminal of the first smoothing capacitor C1 is supplied to the control circuit 16. Further, a signal DC2 corresponding to the potential of the negative terminal of the first smoothing capacitor C1 is supplied to the control circuit 16.

The first resistor R1 and the second resistor R2 are connected in series between a connection point between the anode of the first diode D1 and the cathode of the second diode D2 and the second terminal AC2 of the filter circuit 11. That is, the first resistor R1 and the second resistor R2 are connected in series, through the filter circuit 11, between the second terminal of the AC power supply AC and the connection point between the anode of the first diode D1 and the cathode of the second diode D2. The first resistor R1 is connected between the second resistor R2 and the second terminal AC2 of the filter circuit 11. In addition, the second resistor R2 is connected between the first resistor R1 and the connection point between the anode of the first diode D1 and the cathode of the second diode D2. That is, the connection point between the anode of the first diode D1 and the cathode of the second diode D2, the second resistor R2, the first resistor R1, and the second terminal AC2 of the filter circuit 11 are connected in this order. The connection point between the first resistor R1 and the second resistor R2 is referred to as a connection point M. The resistance values of the first resistor R1 and the second resistor R2 are very small values of about $0.01\Omega$, for example.

The connection point between the first resistor R1 and the second terminal AC2 of the filter circuit 11 is connected to the control circuit 16. As a result, a signal IS1 corresponding to the current flowing through the first resistor R1 is supplied to the control circuit 16. The signal IS1 has a positive voltage referenced to the potential of the connection point M when the current flows through the first resistance R1 from the first resistance R1 toward the connection point M, and has a negative voltage referenced to the potential of the connection point M (GND) when the current flows through the first resistance R1 from the connection point M toward the first resistance R1.

A connection point between the second resistor R2, the anode of the first diode D1, and the cathode of the second diode D2 is connected to the control circuit 16. As a result, a signal IS2 corresponding to the current flowing through the second resistor R2 is supplied to the control circuit 16. The signal IS2 has a positive voltage referenced to the potential of the connection point M when the current flows through the second resistance R2 from the second resistance R2 toward the connection point M, and has a negative voltage referenced to the potential of the connection point M when the current flows through the second resistance R2 from the connection point M toward the second resistance R2.

According to the configuration described above, one of the signals IS1 and IS2 is a positive signal, and the other is a negative signal. According to such a configuration, the first resistor R1 and the second resistor R2 configure a current detection circuit 17 that supplies, to the control circuit 16, a positive voltage signal indicating the value of the current flowing through the first coil L1. The first resistor R1 serves as a first current detector. In addition, the second resistor R2 serves as a second current detector.

The LLC resonance circuit 13 is a DC-DC conversion circuit that supplies a necessary DC voltage to the load circuit 2 from a high DC voltage supplied from the totem-pole PFC 12. The LLC resonance circuit 13 includes switching elements S3, S4, S5, and S6, a second coil L2, a first winding L3, a second winding L4, a third winding L5, a second smoothing capacitor C2, and a third smoothing capacitor C3.

The switching elements S3, S4, S5, and S6 are switching elements that are turned on and off according to the control of the control circuit 16. The switching elements S3, S4, S5, and S6 are silicon MOSFETs, for example. Since the LLC resonance circuit 13 utilizes a resonance phenomenon, it is not necessary to perform high-speed switching in circuit operation. Therefore, unlike the totem-pole PFC 12, the silicon MOSFET may be used.

The switching element S3 is turned on and off by a gate signal G3 supplied from the control circuit 16. The switching element S4 is turned on and off by a gate signal G4 supplied from the control circuit 16. The switching element S5 is turned on and off by a gate signal G5 supplied from the control circuit 16. The switching element S6 is turned on and off by a gate signal G6 supplied from the control circuit 16.

The drain terminal of the switching element S3 is connected to one output terminal of the totem-pole PFC 12 (for example, to the positive terminal of the first smoothing capacitor C1). The source terminal of the switching element S4 is connected to the other output terminal of the totem-pole PFC 12 (for example, to the negative terminal of the first smoothing capacitor C1), and the drain terminal thereof is connected to the source terminal of the switching element S3. In addition, the second coil L2, the second smoothing capacitor C2, and the first winding L3 are connected in series between a connection point between the switching element S3 and the switching element S4 and a source terminal of the switching element S4.

The first winding L3, the second winding L4, and the third winding L5 configure an insulating transformer T1. The second winding L4 and the third winding L5 are insulated from the first winding L3, and are excited by a magnetic field generated in the first winding L3. The second winding L4 and the third winding L5 are connected to each other. The insulating transformer T1 is configured such that the ratio (turns ratio) of the number of turns (T) of the first winding L3 to the second winding L4 is equal to the ratio of the number of turns of the first winding L3 to the third winding L5. In the insulating transformer T1, the turns ratio of the first winding L3 to the second winding L4 (L3:L4) and the turns ratio of the first winding L3 to the third winding L5 (L3:L5) are determined depending on whether the LLC resonance circuit 13 performs a step-up conversion or a step-down conversion. For example, when the LLC resonance circuit 13 is configured to perform the step-down conversion, the turns ratio (L3:L4) and the turns ratio (L3:L5) are determined to be 20 T: 5 T, for example, such that the number of turns of the second winding L4 and the third winding L5 on the secondary side is smaller than the number of turns of the first winding L3 on the primary side.

According to the configuration described above, the switching element S3 and the switching element S4 are turned on and off so that an alternating current flows through the second coil L2. Further, an alternating current equivalent to that of the second coil L2 flows through the first winding L3. As a result, a magnetic field that varies in accordance with the alternating current is generated in the insulating transformer T1. An induced voltage is generated in the second winding L4 and the third winding L5 due to a variation in magnetic field (variation in magnetic flux) generated in the insulating transformer T1. Due to the induced voltage, an alternating current flows through the second winding L4 and the third winding L5. Specifically, a positive half-wave portion of the alternating current flows through the second winding L4, and a negative half-wave portion of the alternating current flows through the third winding L5. That is, currents having inverse phases flow for each half-wave through the second winding L4 and the third winding L5, respectively. The currents are converted into the positive current by the switching elements S5 and S6 for synchronous rectification, and both are charged to the third capacitor C3 as positive currents.

In the switching element S5, the source terminal is connected to the second winding L4, and the drain terminal is connected to the positive terminal of the third capacitor C3. In the switching element S6, the source terminal is connected to the third winding L5, and the drain terminal is connected to the positive terminal of the third capacitor C3. The negative terminal of the third capacitor C3 is connected to a connection point between the second winding L4 and the third winding L5. In addition, the load circuit 2 is connected to the third capacitor C3 in parallel.

According to the configuration described above, the switching element S5 serves as a body diode that allows current to flow from the second winding L4 to the positive terminal of the third capacitor C3. In addition, the switching element S6 serves as a body diode that allows a current to flow from the third winding L5 to the positive terminal of the third capacitor C3.

According to the configuration described above, the current flows through the body diodes of the switching elements S5 and S6 even when the switching elements S5 and S6 are in the off state. Therefore, at the timing when the alternating current flows through the first winding L3, the current flows through the second winding L4 and the third winding L5. The current flowing through the body diodes of the switching elements S5 and S6 is charged into the third capacitor C3. As a result, DC power is supplied to the load circuit 2 connected to the third capacitor C3.

In this example, since the current flows through the body diodes of the switching elements S5 and S6, there is a forward voltage difference of about 1 V. For example, if a current of 10 [A] flows, loss=forward voltage×current=10 W.

On the other hand, when the switching element S5 and the switching element S6 are each conducting, based on assumption that the ON resistance is 0.01 [Ω], loss=square of current×resistance=10×10×0.01 Ω=1 W. For this reason, the control circuit 16 may be configured to turn on the switching elements S5 and S6 by the gate signals G5 and G6 in accordance with the timing at which the current flows through the respective body diodes of the switching elements S5 and S6. Thereby, the conduction loss may be reduced and an efficient power converter may be configured.

Hereinafter, the description will be provided below, based on the assumption that the potential at the connection point M between the first resistor R1 and the second resistor R2 is GND. The insulating AC-DC circuit 14 generates a DC voltage VCC having any voltage value referenced to the GND which is the potential of the connection point M between the first resistor R1 and the second resistor R2, and supplies the DC voltage VCC to the control circuit 16. The insulating AC-DC circuit 14 generates a DC voltage VCC insulated from the AC power supply AC based on the AC voltage of the AC power supply AC. The insulating AC-DC circuit 14 is connected to the first terminal AC1 and the second terminal AC2 of the filter circuit 11. The insulating AC-DC circuit 14 receives a portion of the AC voltage supplied from the first terminal AC1 and the second terminal AC2 of the filter circuit 11 and uses it to generate the DC voltage VCC that is a voltage necessary for the operation of the control circuit 16. The control circuit 16 performs various types of signal processing and signal output based on the GND.

The AC voltage detection circuit 15 detects an AC voltage of the AC power supply AC and supplies the detection result to the control circuit 16. The AC voltage detection circuit 15 is connected to the connection point M between the first resistor R1 and the second resistor R2, and to the first terminal AC1 of the filter circuit 11. Since the resistance value of the second resistor R2 is a very small value, it may be considered that the potential of the connection point M. and the potential of the second terminal AC2 of the filter circuit 11 are substantially equal to each other. That is, the AC voltage detection circuit 15 detects an alternating current voltage (ACV) signal indicating the voltage of the AC power supply AC with reference to the potential of the first terminal AC1 of the filter circuit 11 and the potential of the second terminal AC2 of the filter circuit 11, and supplies the signal to the control circuit 16. The AC voltage detection circuit 15 may be configured to supply the signal ACV as an analog value to the control circuit 16 or may be configured to supply the signal ACV as a digital value to the control circuit 16. Hereinafter, the potential of the first terminal AC1 of the filter circuit 11 is simply referred to as AC1, and the potential of the second terminal AC2 of the filter circuit 11 is simply referred to as AC2.

The control circuit 16 controls the switching elements of the totem-pole PFC 12 and the LLC resonance circuit 13. The control circuit 16 receives the DC voltage VCC for operation from the insulating AC-DC circuit 14. The control circuit 16 receives the signal ACV from the AC voltage detection circuit 15. In addition, the control circuit 16 receives the signals IS1 and IS2 from the current detection circuit 17. As described above, the signals IS1 and IS2 are signals referenced to GND which is the potential of the connection point M. Further, the control circuit 16 receives the signals DC1 and DC2 from the output terminal of the totem-pole PFC 12.

The control circuit 16 generates gate signals G1 and G2 for turning on and off the first half-wave switch S1 and the second half-wave switch S2 with reference to the signal ACV, the signals IS1 and IS2, and the signals DC1 and DC2, and transmits the gate signals to the totem-pole PFC 12. Accordingly, the control circuit 16 controls the pulse widths of the gate signals G1 and G2 so that the current flowing through the first coil L1 has a sine wave having the same phase as the phase of the input AC voltage.

Further, the control circuit 16 generates gate signals G3 to G6 for turning on and off the switching elements S3, S4, S5, and S6 with reference to the output voltage of the LLC resonance circuit 13, and transmits the gate signals to the LLC resonance circuit 13.

Next, the operation of the totem-pole PFC 12 will be described.

As described above, the totem-pole PFC 12 operates according to the gate signals G1 and G2 from the control circuit 16. For example, the totem-pole PFC 12 operates while switching between the four states shown in FIG. 2.

Figure 2:
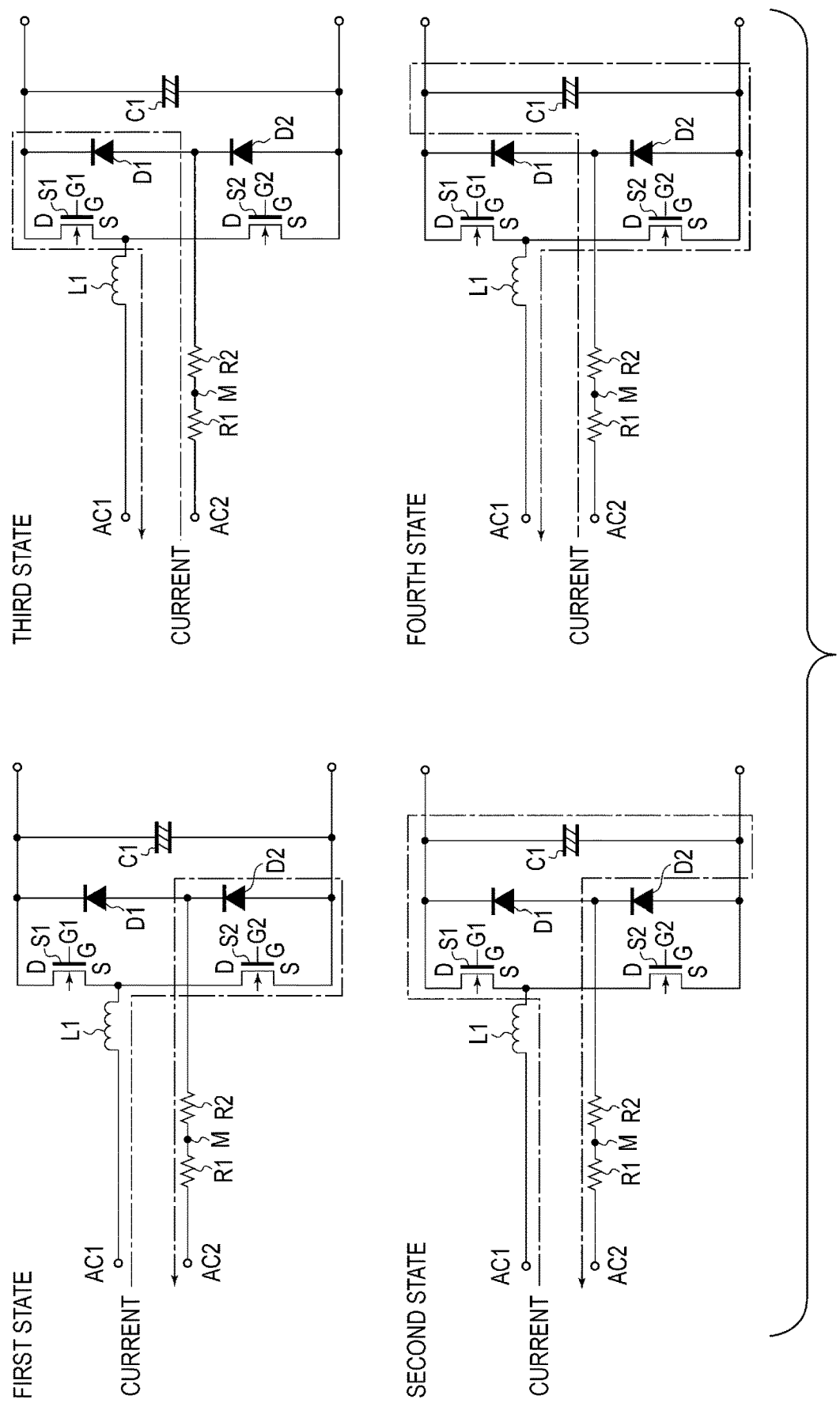
FIG. 2 is a diagram for explaining an example of an operation of a totem-pole PFC according to an embodiment.

The first state is a state in which AC1>AC2 (AC1 is positive with respect to AC2), and in which the first half-wave switch S1 is turned off by the gate signal G1 (gate signal G1 is off), and the second half-wave switch S2 is turned on by the gate signal G2 (gate signal G2 is on). In this case, as shown in FIG. 2, a current flows in the order of the first coil L1, the second half-wave switch S2, the second diode D2, the second resistor R2, and the first resistor R1. At this time, a positive voltage (signal) is generated at the second resistor R2 with the connection point M as a base point GND. Further, a negative voltage (signal) not used for purpose of control is generated at the first resistor R1.

The second state is a state in which AC1>AC2 (AC1 is positive with respect to AC2), and in which the first half-wave switch S1 is turned off by the gate signal G1 (gate signal G1 is off), and the second half-wave switch S2 is turned off by the gate signal G2 (gate signal G2 is off). In this case, the first half-wave switch S1 serves as a body diode from the source terminal toward the drain terminal. Therefore, as shown in FIG. 2, the current flows in the order of the first coil L1, the first half-wave switch S1, the first smoothing capacitor C1, the second diode D2, the second resistor R2, and the first resistor R1. Also, in this case, a positive voltage (signal) is generated at the second resistor R2 with the connection point M as a base point (GND). Further, a negative voltage (signal) not used for the purpose of control is generated at the first resistor R1.

The totem-pole PFC 12 keeps the first half-wave switch S1 in the off state while AC1>AC2 (AC1 is positive with respect to AC2), and repeatedly turns on and off the second half-wave switch S2 at a high frequency according to the signal G2. Accordingly, the totem-pole PFC 12 repeatedly switches between the first state and the second state while AC1>AC2 (AC1 is positive with respect to AC2).

The third state is a state in which AC1<AC2 (AC1 is negative with respect to AC2), and in which the first half-wave switch S1 is turned on by the gate signal G1 (gate signal G1 is on), and the second half-wave switch S2 is turned off by the gate signal G2 (gate signal G2 is off). In this case, as shown in FIG. 2, the current flows in the order of the first resistor R1, the second resistor R2, the first diode D1, the first half-wave switch S1, and the first coil L1. At this time, a positive voltage (signal) is generated at the first resistor R1 with the connection point M as a base point GND. Further, a negative voltage (signal) not used for the purpose of control is generated at the second resistor R2.

The fourth state is a state in which AC1<AC2 (AC1 is negative with respect to AC2), and in which the first half-wave switch S1 is turned off by the gate signal G1 (gate signal G1 is off), and the second half-wave switch S2 is turned off by the gate signal G2 (gate signal G2 is off). In this case, the second half-wave switch S2 serves as a body diode from the source terminal toward the drain terminal. For this reason, as shown in FIG. 2, the current flows in the order of the first resistor R1, the second resistor R2, the first diode D1, the first smoothing capacitor C1, the second half-wave switch S2, and the first coil L1. Also, in this case, a positive voltage (signal) is generated at the first resistor R1 with the connection point M as a base point (GND). Further, a negative voltage (signal) not used for the purpose of control is generated at the second resistor R2.

The totem-pole PFC 12 keeps the second half-wave switch S2 in the off state while AC1<AC2 (AC1 is negative with respect to AC2), and repeatedly turns on and off the first half-wave switch S1 at a high frequency according to the signal G1. Accordingly, the totem-pole PFC 12 repeatedly switches between the third state and the fourth state while AC1<AC2 (AC1 is negative with respect to AC2).

When AC1>AC2 (AC1 is positive with respect to AC2), the control circuit 16 turns on and off the second half-wave switch S2. As a result, while AC1 is positive with respect to AC2, the control circuit 16 controls the current flowing through the first coil L1 to have a sine wave having the same phase as that of the AC voltage ACV of the AC power supply AC. When AC1<AC2 (AC1 is negative with respect to AC2), the control circuit 16 turns on and off the first half-wave switch S1. Accordingly, while AC1 is negative with respect to AC2, the control circuit 16 controls the current flowing through the first coil L1 to have a sine wave having the same phase as that of the AC voltage ACV of the AC power supply AC. As a result, occurrence of current harmonic noise can be suppressed.

Next, an example of a detailed configuration of the control circuit 16 will be described.

Figure 3:
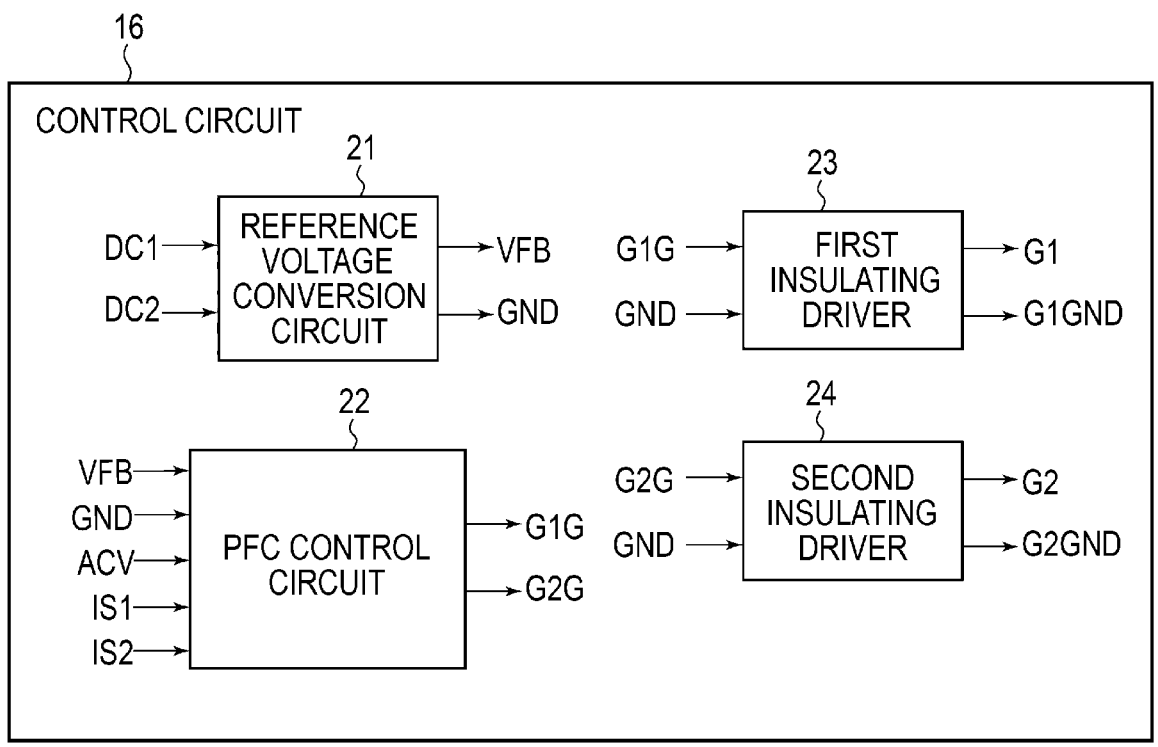
FIG. 3 is a diagram for explaining an example of a configuration of a control circuit according to an embodiment.

FIG. 3 is an explanatory diagram for describing an example of the configuration of the control circuit 16.

The control circuit 16 includes a reference voltage conversion circuit 21, a PFC control circuit 22, a first insulating driver 23, and a second insulating driver 24.

The reference voltage conversion circuit 21 converts the output voltage of the totem-pole PFC 12 into a signal VFB indicating a voltage referenced to the GND. In the totem-pole PFC 12, while AC1>AC2, AC2 and DC2 have the same potential. In the totem-pole PFC 12, while AC1<AC2, AC1 and DC1 have the same potential. As described above, the reference voltage for the output of the totem-pole PFC 12 varies. Therefore, the reference voltage conversion circuit 21 converts the signals DC1 and DC2 received from the output terminal of the totem-pole PFC 12 into the signal VFB indicating a voltage referenced to the GND.

Figure 4:
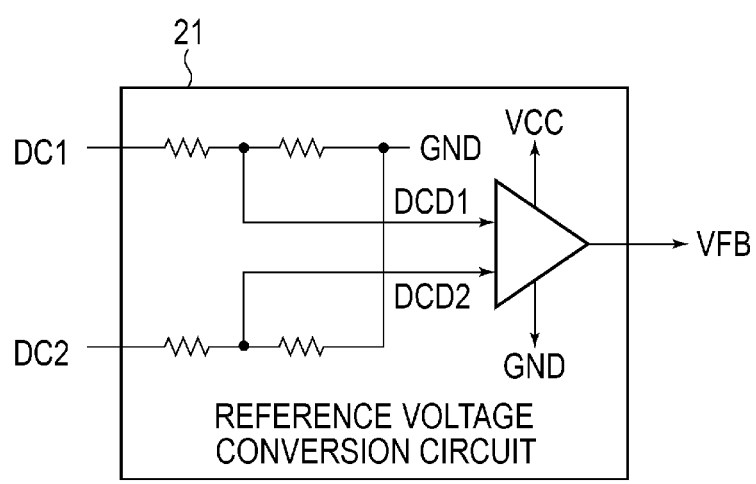
FIG. 4 is a diagram for explaining an example of a configuration of a reference voltage conversion circuit according to an embodiment.

FIG. 4 is an explanatory diagram for describing an example of a configuration of the reference voltage conversion circuit 21. The reference voltage conversion circuit 21 includes a plurality of resistors and an operational amplifier. The reference voltage conversion circuit 21 resistively divides the respective potentials of the signals DC1 and DC2 based on the GND, and inputs the divided signals DCD1 and DCD2 to two terminals of the operational amplifier. In this case, the resistance values of the resistors are determined such that the divided voltage values do not exceed the DC voltage VCC. That is, the signals DCD1 and DCD2 appear as potentials equal to or greater than GND and equal to or less than VCC. The operational amplifier outputs, as the signal VFB, a difference between the signal DCD1 and the signal DCD2.

The reference voltage conversion circuit 21 may be configured to output the signal VFB by another method. For example, the reference voltage conversion circuit 21 converts the potential difference between the signals DC1 and DC2 into a pulse width, and inputs the pulse to a photocoupler or the like. As a result, a pulse conduction current referenced to the GND is generated. A voltage corresponding to the pulse width is regenerated based on the GND. This makes it possible to convert a potential difference between portions having different potentials into a signal referenced to the GND.

Figure 5:
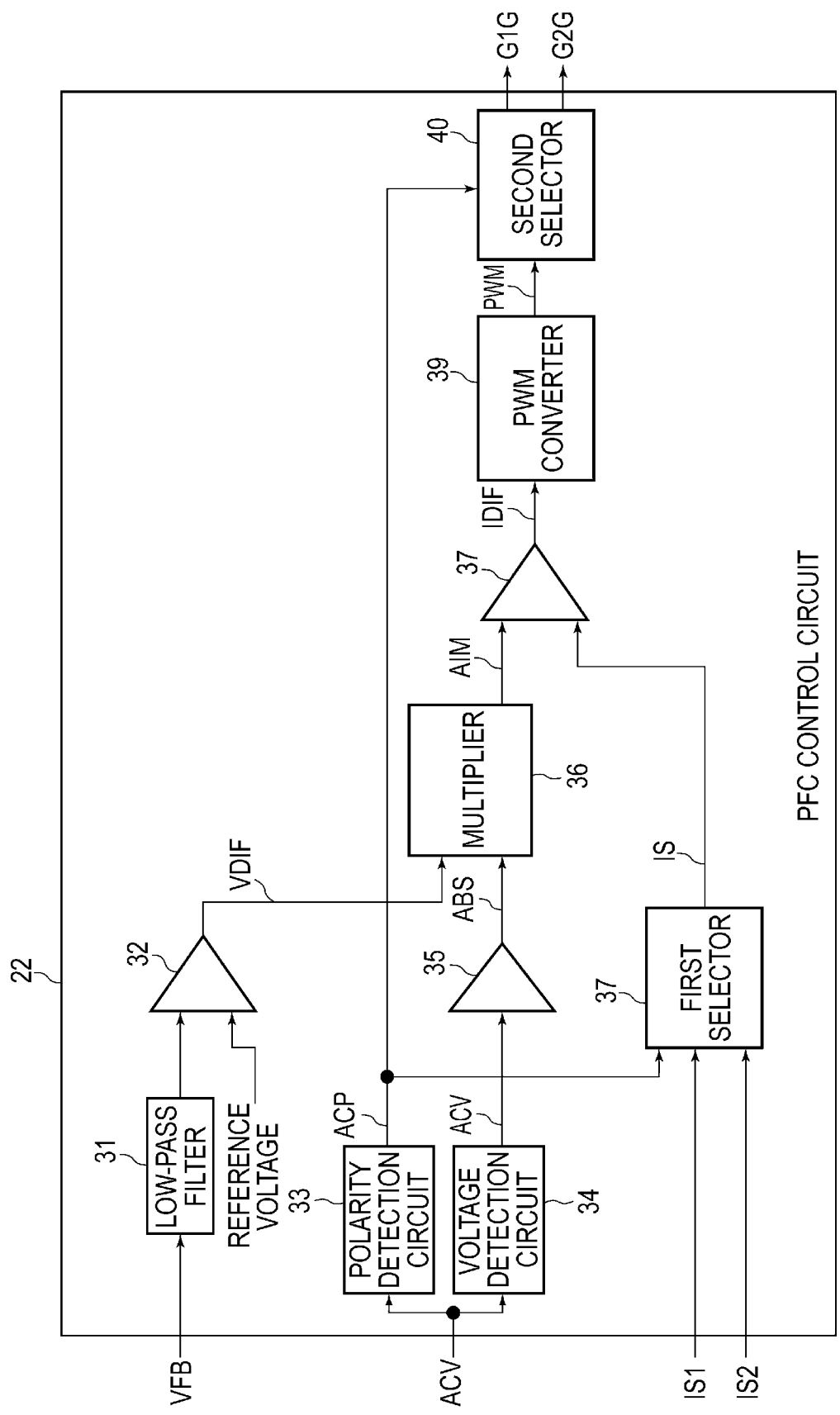
FIG. 5 is a diagram for explaining an example of a configuration of a PFC control circuit according to an embodiment.

FIG. 5 is an explanatory diagram for describing an example of a configuration of the PFC control circuit 22. The PFC control circuit 22 outputs signals G1G and G2G used for controlling the first half-wave switch S1 and the second half-wave switch S2 of the totem-pole PFC 12 with reference to the signal VFB, the signal ACV, and the signal IS1 and IS2.

The PFC control circuit 22 includes a low-pass filter 31, a first comparator 32, a polarity detection circuit 33, a voltage detection circuit 34, an absolute value conversion circuit 35, a multiplier 36, a first selector 37, a second comparator 38, a PWM converter 39, and a second selector 40.

The signal VFB is input to the low-pass filter 31. The low-pass filter 31 cuts a high frequency component of the input signal VFB and inputs the cut signal to the first comparator 32. For example, the low-pass filter 31 is set to a lower frequency than the frequency of the AC power supply of 50 Hz. For example, the low-pass filter 31 is set to transmit a frequency component lower than 20 Hz. That is, the low-pass filter 31 is configured to cut a frequency component higher than 20 Hz. According to this configuration, the low-pass filter 31 may cancel the 100 Hz (full-wave of 50 Hz) component generated in the first smoothing capacitor and output a mean value of the voltage of the first smoothing capacitor.

The output of the low-pass filter 31 and the reference voltage are input to the first comparator 32. The first comparator 32 outputs a comparison result between the output of the low-pass filter 31 and the reference voltage, to the multiplier 36. That is, the first comparator 32 outputs a signal VDIF, which is the comparison result between the low-frequency component of the signal VFB and the reference voltage. Specifically, the first comparator 32 subtracts the reference voltage from the low frequency component of the signal VFB, and outputs the result as the signal VDIF. That is, the signal VDIF indicates a displacement of the signal VFB with respect to the reference voltage.

The reference voltage is set to any value. The reference voltage is set to 400 V, for example. By setting the reference voltage to 400 V, it is possible to support the AC voltages worldwide. Since the highest AC voltage in the world is 264 V, its peak value is 372 V, which is 1.41 times 264 V. By setting a higher voltage as the reference voltage, universal worldwide power conversion is enabled.

The polarity detection circuit 33 detects the polarity of the AC voltage supplied from the AC power supply AC based on the signal ACV, and outputs the detection result as a signal ACP. The polarity detection circuit 33 outputs the signal ACP to the first selector 37 and the second selector 40. The polarity detection circuit 33 outputs, as the signal ACP, a logical value of "0" or "1" based on whether the value of the signal ACV is positive or negative. For example, it is configured such that the signal ACV indicates the potential of the first terminal AC1 with respect to the second terminal AC2 of the filter circuit 11. In this case, the polarity detection circuit 33 outputs the signal ACP of "1" when the signal ACV is positive, and outputs the signal ACP of "0" when the signal ACV is negative. That is, the polarity detection circuit 33 outputs the signal ACP of "1" when the potential of the first terminal AC1>the potential of the second terminal AC2, and outputs the signal ACP of "0" when the potential of the first terminal AC1<the potential of the second terminal AC2.

The voltage detection circuit 34 converts the signal ACV into a signal having a voltage of any width and outputs the signal to the absolute value conversion circuit 35. The signal ACV input to the voltage detection circuit 34 has an instantaneous value of −141 to 141 V when the AC power supply AC has an effective value of 100 V. The voltage detection circuit 34 converts the instantaneous value of the AC voltage of AC power supply AC indicated by the signal ACV into a value within a preset range. That is, the voltage detection circuit 34 normalizes the instantaneous value of the AC voltage of the AC power supply AC indicated by the signal ACV. Specifically, the voltage detection circuit 34 converts the instantaneous value of the AC voltage of the AC power supply AC indicated by the signal ACV into an instantaneous value in the range of −1 to 1. It is possible to determine the phase of the sinusoidal waveform based on the signal ACV converted by the voltage detection circuit 34. That is, the signal ACV normalized by the voltage detection circuit 34 may be referred to as sine wave phase information indicating the phase of the sine wave.

The absolute value conversion circuit 35 converts the signal ACV output from the voltage detection circuit 34 into a signal ABS that is an absolute value signal, and outputs the signal ABS to the multiplier 36. The absolute value conversion circuit 35 converts the signal ACV output from the voltage detection circuit 34 into an absolute value to convert into a signal having a value of 0 to 1 (full-wave rectified signal).

The multiplier 36 multiplies the signal VDIF supplied from the first comparator 32 by the signal ABS supplied from the absolute value conversion circuit 35. The multiplier 36 outputs the result of multiplying the signal VDIF by the signal ABS to the second comparator 38 as a signal AIM. The signal AIM indicates a target current value.

The signal ACP and the signals IS1 and IS2 are input to the first selector 37. The first selector 37 outputs one of the signals IS1 and IS2 to the second comparator 38 as the signal IS based on the signal ACP. When the signal ACP is "1", the first selector 37 outputs the signal IS2 to the second comparator 38 as the signal IS. In addition, when the signal ACP is "0", the first selector 37 outputs the signal IS1 to the second comparator 38 as the signal IS. That is, the first selector 37 outputs the signal IS2 to the second comparator 38 as the signal IS when the potential of the first terminal AC1>the potential of the second terminal AC2, and outputs the signal IS1 to the second comparator 38 as the signal IS when the potential of the first terminal AC1<the potential of the second terminal AC2.

The signal AIM and the signal IS are input to the second comparator 38. The second comparator 38 outputs a signal IDIF, which is the comparison result between the signal AIM and the signal IS, to the PWM converter 39. The signal IDIF indicates a difference between the signal AIM that is a target current value and the signal IS that indicates an actually flowing current.

The PWM converter 39 generates a signal PWM that is a pulse width modulation signal based on the value of the signal IDIF, and outputs the signal PWM to the second selector 40. For example, the PWM converter 39 increases the pulse width when the current that is actually flowing is smaller than the target current value, and decreases the pulse width when the current that is actually flowing is greater than the target current value.

The signal ACP and the signal PWM are input to the second selector 40. Based on the signal ACP, the second selector 40 switches between outputting the signal PWM to the first insulating driver 23 as the signal G1G and outputting the signal PWM to the second insulating driver 24 as the signal G2G. Specifically, when the signal ACP is "1", the second selector 40 outputs the signal PWM to the second insulating driver 24 as the signal G2G. In addition, when the signal ACP is "0", the second selector 40 outputs the signal PWM to the first insulating driver 23 as the signal G1G. Note that the signal PWM, that is, the signal G1G or the signal G2G is a signal referenced to the GND. The signal supplied to one of the first insulating driver 23 and the second insulating driver 24 to which the signal PWM is not output, is "0 (stop signal)".

In the first insulating driver 23 and the second insulating driver 24, the signal input to the primary side is insulated and output from the secondary side.

Figure 6:
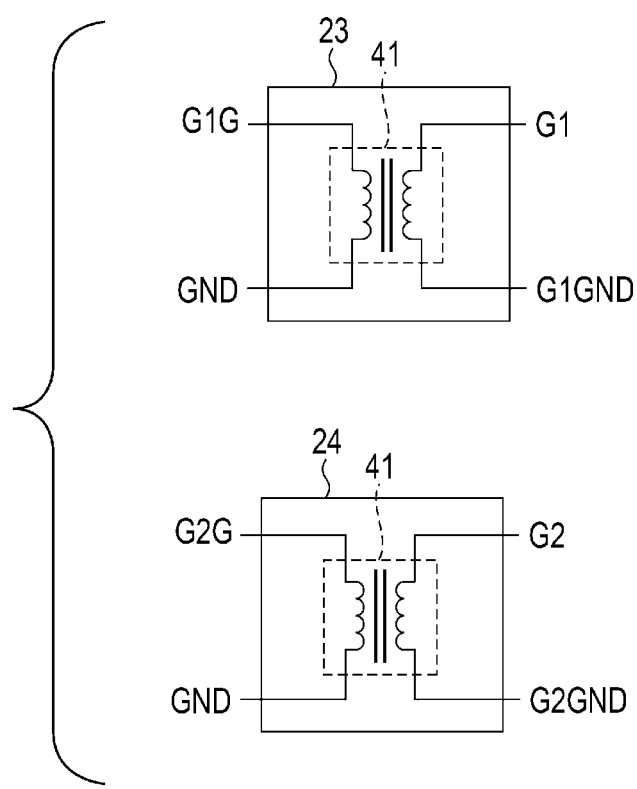
FIG. 6 is a diagram for explaining an example of a configuration of a first insulating driver and a second insulating driver according to an embodiment.

FIG. 6 is an explanatory diagram for describing an example of a configuration of the first insulating driver 23 and the second insulating driver 24. The first insulating driver 23 and the second insulating driver 24 include a pulse transformer 41, respectively, for example. The pulse transformer 41 includes a primary winding, a secondary winding, and a magnetic core.

As shown in FIG. 6, the primary winding of the pulse transformer 41 of the first insulating driver 23 is connected to the G1G referenced to the GND and the GND, and the secondary winding of the pulse transformer 41 is connected to the G1 reference to G1GND. Specifically, the primary side winding of the pulse transformer 41 is connected to the second selector 40 of the totem-pole PFC 12 and the GND. In addition, a gate terminal of the first half-wave switch s1 and a source terminal of the first half-wave switch s1 are connected to the secondary winding of the pulse transformer 41.

According to the configuration described above, the signal G1G, which is a pulse signal referenced to the GND output from the totem-pole PFC 12, is input to the primary winding of the pulse transformer 41 of the first insulating driver 23. When the signal G1G referenced to the GND is input to the primary winding of the pulse transformer 41, an induced voltage is generated in the secondary winding of the pulse transformer 41. Due to this induced voltage, a signal G1, which is a pulse signal that is referenced to the potential G1GND of the source terminal of the first half-wave switch S1 and that is in accordance with the signal G1G, is input to the gate terminal of the first half-wave switch S1 from the secondary winding of the pulse transformer 41. As a result, the first half-wave switch S1 is turned on and off based on the signal G1.

As shown in FIG. 6, the primary winding of the pulse transformer 41 of the second insulating driver 24 is connected to the G2G referenced to the GND and the GND, and the secondary winding of the pulse transformer 41 is connected to the G2 reference to G2GND. Specifically, the primary side winding of the pulse transformer 41 is connected to the second selector 40 of the totem-pole PFC 12 and the GND. In addition, a gate terminal of the second half-wave switch S2 and a source terminal of the second half-wave switch S2 are connected to the secondary winding of the pulse transformer 41.

According to the configuration described above, the signal G2G, which is a pulse signal referenced to the GND output from the totem-pole PFC 12, is input to the primary winding of the pulse transformer 41 of the second insulating driver 24. When the signal G2G referenced to the GND is input to the primary winding of the pulse transformer 41, an induced voltage is generated in the secondary winding of the pulse transformer 41. Due to this induced voltage, a signal G2, which is a pulse signal that is referenced to the potential G2GND of the source terminal of the second half-wave switch S2 and that is in accordance with the signal G2G, is input to the gate terminal of the second half-wave switch S2 from the secondary winding of the pulse transformer 41.

Note that the first insulating driver 23 and the second insulating driver 24 may further include a filter capacitor that is connected in series to the primary winding of the pulse transformer 41 and that cuts the DC component.

Further, the signal G1 and the signal G2 are positive and negative signals with respect to G1GND and G2GND, respectively. Therefore, the turns ratio of the coils of the pulse transformer 41 may be adjusted such that the values of the signals G1 and G2 are doubled (to be the same voltage as the primary side).

Further, the first insulating driver 23 and the second insulating driver 24 may further include a filter capacitor that is connected in series to the secondary coil of the pulse transformer 41 and that cuts the DC component.

Further, the first insulating driver 23 and the second insulating driver 24 may be configured to convert, with a photocoupler, the signals G1G and G2G into the signals G1 and G2 reference to the G1GND and the G2GND. Since the signal output from the photocoupler is weak, a buffer circuit may be further provided.

Further, the first insulating driver 23 and the second insulating driver 24 may boost a signal output from the photocoupler by a DC power supply for boosting with a bootstrap method, and transmit the boosted signal to the gate terminal of the second half-wave switch S2. For example, when the signal G2 is on, the potential of the G1GND is equal to the potential of the G2GND. When the DC power supply for boosting is connected to the G2GND side, the potential of the DC power supply for boosting is also supplied to the G1GND through the body diode of the second half-wave switch S2. After that, when the signal G2 is off, the potential of G1GND is separated from the potential of G2GND, but the potential reference to the G1GND is maintained. By using this potential, the signal output from the photocoupler may be amplified and input to the gate terminal of the first half-wave switch S1.

Figure 7:
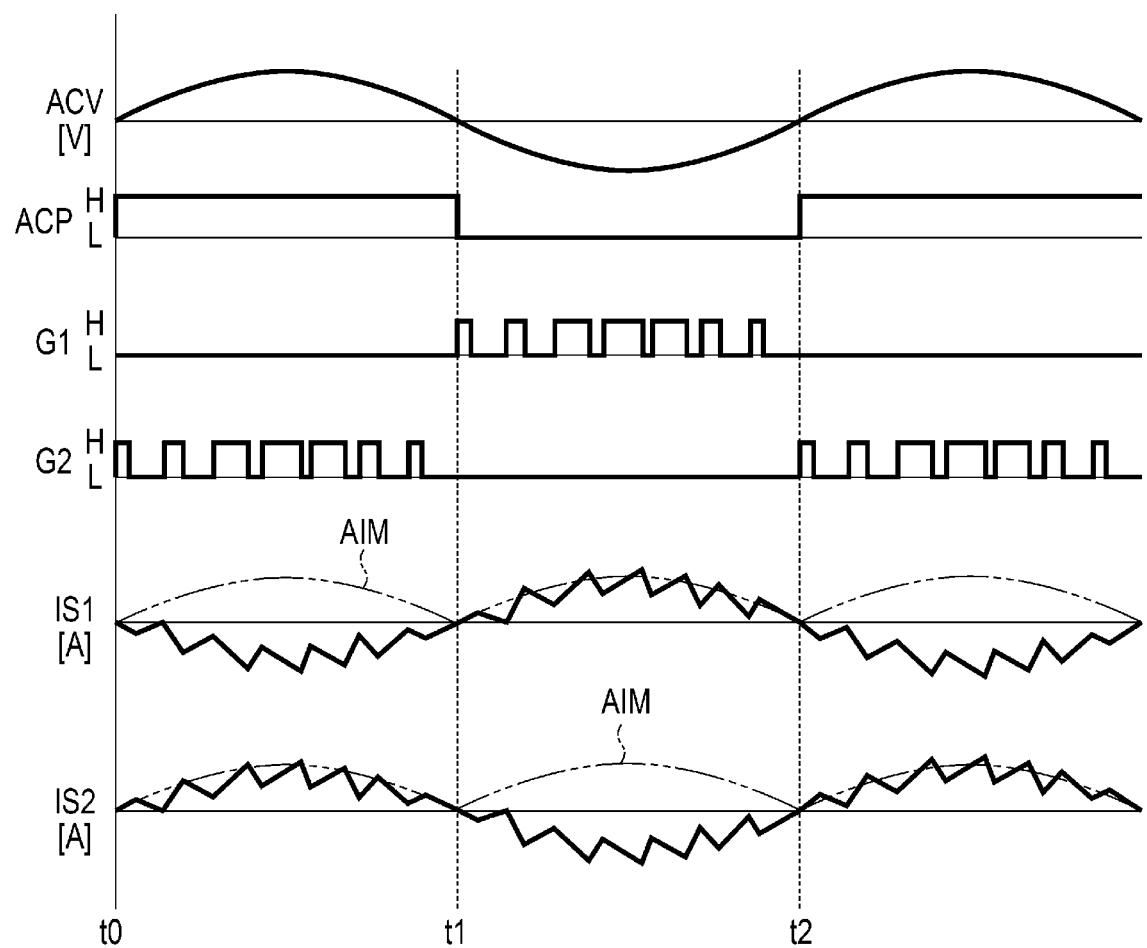
FIG. 7 is a diagram for explaining control of a totem-pole PFC according to an embodiment.

FIG. 7 is an explanatory diagram for describing the relationship between the current flowing through the totem-pole PFC 12 and the voltage of the AC power supply AC. FIG. 7 shows an example of the signal ACV indicating the voltage of the AC power supply AC, the signal ACP indicating the result of the polarity detection, the signal G1 input to the gate terminal of the first half-wave switch S1, the signal G2 input to the gate terminal of the second half-wave switch S2, the signal IS1 indicating the current flowing through the first resistor R1, and the signal IS2 indicating the current flowing through the second resistor R2. In the example of FIG. 7, the polarity is positive (AC1>AC2) between the timing t0 and the timing t1, the polarity is negative (AC1<AC2) between the timing t1 and the timing t2, and the polarity is positive again (AC1>AC2) after the timing t2.

As described above, the polarity detection circuit 33 outputs the signal ACP having the logical value "1" while AC1>AC2, and outputs the signal ACP having the logical value "0" while AC1<AC2.

In addition, the control circuit 16 of the totem-pole PFC 12 sequentially calculates the signal AIM indicating a target current with reference to the signal VFB indicating an output voltage of the totem-pole PFC 12 and the signal ACV indicating an AC voltage.

While AC1>AC2, the control circuit 16 generates the signal PWM with reference to the signal IDIF, which is the comparison result between the signal AIM and the signal IS2. That is, the control circuit 16 generates the signal PWM such that the difference between the signal AIM and the signal IS2 decreases, and inputs the signal PWM as the signal G2 to the gate terminal of the second half-wave switch S2. Thereby, while AC1>AC2, the totem-pole PFC 12 turns on and off the second half-wave switch S2 according to the signal G2. Accordingly, the totem-pole PFC 12 switches between the first state and the second state shown in FIG. 2 according to the signal G2. In the first state, the signal IS2 increases (linearly increases), and in the second state, the signal IS2 decreases (linearly decreases). The totem-pole PFC 12 controls the duration of the first state and the second state by performing pulse width control. Specifically, the totem-pole PFC 12 controls the ON duty of the signal G2 corresponding to the duration of the first state in one cycle with a fixed frequency. Thereby, the duration of the second state is also determined by subtracting the duration of the first state from the duration within one cycle. As described above, the totem-pole PFC 12 may make the signal AIM, which is the target waveform of the signal IS2, close to the signal IS2 while switching between the first state and the second state a plurality of times.

Further, while AC1<AC2, the control circuit 16 generates the signal PWM with reference to the signal IDIF, which is the comparison result between the signal AIM and the signal IS1. That is, the control circuit 16 generates the signal PWM such that the difference between the signal AIM and the signal IS1 decreases, and inputs the signal PWM as the signal G1 to the gate terminal of the first half-wave switch S1. Thereby, while AC1<AC2, the totem-pole PFC 12 turns on and off the first half-wave switch S1 according to the signal G1. Accordingly, the totem-pole PFC 12 switches between the third state and the fourth state shown in FIG. 2 according to the signal G1. In the third state, the signal IS1 decreases (linearly decreases), and in the fourth state, the signal IS1 increases (linearly increases). The totem-pole PFC 12 controls the duration of the third state and the fourth state by performing pulse width control. Specifically, the totem-pole PFC 12 controls the ON duty of the signal G1 corresponding to the duration of the third state in one cycle with a fixed frequency. Thereby, the duration of the fourth state is also determined by subtracting the duration of the third state from the duration within one cycle.

As a result, as shown in FIG. 7, the current flowing from the second resistor R2 toward the connection point M has a sine wave having the same phase as the signal ACV as shown by the signal IS2.

As described above, the power converter 1 includes the totem-pole power factor correction circuit (totem-pole PFC 12), the current detection circuit 17, and the control circuit 16.

The totem-pole PFC 12 includes the first coil L1 connected to the first terminal of the AC power supply AC through the filter circuit 11, the first half-wave switch S1 including the source terminal connected to the first coil L1, the second half-wave switch S2 including the drain terminal connected to the source terminal of the first half-wave switch S1, the first diode D1 including the cathode connected to the drain terminal of the first half-wave switch S1 and the anode connected to the second terminal of the AC power supply AC through the filter circuit 11, the second diode D2 including the anode connected to the source terminal of the second half-wave switch S2 and the cathode connected to the second terminal of the AC power supply AC via the filter circuit 11, and the first smoothing capacitor C1 connected between the cathode of the first diode D1 and the anode of the second diode D2.

The current detection circuit 17 includes a series connection of the first current detector (first resistor R1) and the second current detector (second resistor R2) connected between the connection point between the anode of the first diode D1 and the cathode of the second diode D2, and the second terminal of the AC power supply AC. The signal IS1, which is a detection result of current by the first current detector, indicates a current flowing from the first resistor toward the connection point with the second resistor. The signal IS2, which is a detection result of current by the second current detector, indicates a current flowing from the second resistor toward the connection point with the first resistor.

The control circuit 16 performs a pulse width control for turning on and off the first half-wave switch S1 and the second half-wave switch S2 with reference to the signal IS1 or the signal IS2.

According to such a configuration, one of the signals IS1 and IS2 is detected as a positive value. Therefore, the current detection circuit 17 may directly input the signals IS1 and IS2 to the control circuit 16. As a result, highly efficient power conversion can be achieved with a simple configuration.

Further, the control circuit 16 includes the polarity detection circuit 33 that detects the polarity of the AC voltage supplied from the AC power supply AC based on the GND voltage which is the voltage at the connection point between the first current detector and the second current detector. The control circuit 16 switches a switch for performing the pulse width control, between the first half-wave switch S1 and the second half-wave switch S2, based on the detection result of the polarity detection circuit 33.

Further, the control circuit 16 switches the detection result of current to be used for the pulse width control, between the detection result of current by the first current detector and the detection result of current by the second current detector, based on the detection result of the polarity detection circuit 33.

Further, when the first terminal of the AC power supply AC has a positive potential, the control circuit 16 turns on and off the second half-wave switch S2 based on the signal IS2 which is the detection result of current by the second current detector, and when the second terminal of the AC power supply AC has a positive potential, the control circuit 16 turns on and off the first half-wave switch S1 based on the signal IS1 which is a detection result of current by the first current detector.

Further, the control circuit 16 converts the voltage across the first smoothing capacitor C1 into a voltage referenced to the GND voltage which is a voltage at a connection point between the first current detector and the second current detector, and performs a pulse width control based on the converted voltage.

As described above, the power converter 1 may control the current flowing through the first coil L1 to have a sine wave having the same phase as the phase of the voltage of the AC power supply AC by switching a switch to perform the pulse width control, between the first half-wave switch S1 and the second half-wave switch S2, according to the polarity of the voltage of the AC power supply AC. As a result, the power converter 1 may realize a reduction in recovery loss with a simple configuration.

In the embodiment described above, it is described that the second half-wave switch S2 is turned on and off while AC1>AC2, and the first half-wave switch S2 is turned on and off while AC1<AC2, but is not limited to this configuration. The control circuit 16 may be configured to turn on the first half-wave switch S1 while AC1>AC2 and while the second half-wave switch S2 is turned off, and to turn on the second half-wave switch S1 while AC1<AC2 and while the first half-wave switch S2 is turned off.

While AC1>AC2 and while the second half-wave switch S2 is turned off, the first half-wave switch S1 serves as a body diode from the source terminal toward the drain terminal. Further, while AC1<AC2 and while the first half-wave switch S1 is turned off, the second half-wave switch S2 serves as a body diode from the source terminal toward the drain terminal.

However, the loss when the first half-wave switch S1 is on is smaller than the loss of the body diode of the first half-wave switch S1. In addition, the loss when the second half-wave switch S2 is turned on is smaller than the loss of the body diode of the second half-wave switch S2. Therefore, as described above, while AC1>AC2 and while the second half-wave switch S2 is turned off, the first half-wave switch S1 is turned on, and while AC1<AC2 and while the first half-wave switch S1 is turned on, the second half-wave switch S2 is turned on, so that the loss of the circuit of the totem-pole PFC 12 may be reduced.

Likewise, each of the first diode D1 and the second diode D2 may be replaced with a MOSFET. Specifically, the first diode D1 may be configured as a body diode of a FET that is turned on while AC1>AC2 and turned off while AC1<AC2. In addition, specifically, the second diode D2 may be configured as a body diode of a FET that is turned off while AC1>AC2 and turned on while AC1<AC2. Also with such a configuration, the loss of the circuit of the totem-pole PFC 12 may be reduced.

Note that it is desired that the first half-wave switch S1 and the second half-wave switch S2 in the embodiment described above are formed of a wide bandgap semiconductor for high-speed switching. However, since the current flowing through the first diode D1 and the second diode D2 has a 50 Hz component which is the frequency of the AC power supply AC, when a synchronous rectification FET is used instead of the first diode D1 and the second diode D2, a FET formed of a silicon semiconductor having a relatively slow response may be used.

When a synchronous rectification FET is used instead of the first diode D1 and the second diode D2, the cathodes of the first diode D1 and the second diode D2 are replaced with the drain terminal of the FET, and the anodes of the first diode D1 and the second diode D2 are replaced with the source terminal of the FET.

In the embodiment described above, it is described that the polarity detection circuit 33 is configured to detect the polarity of the AC voltage supplied from the AC power supply AC based on the signal ACV and output the detection result as the signal ACP. The polarity detection circuit 33 may be realized by a combination of a processor and a memory storing a program, or may be realized by an analog circuit.

Figure 8:
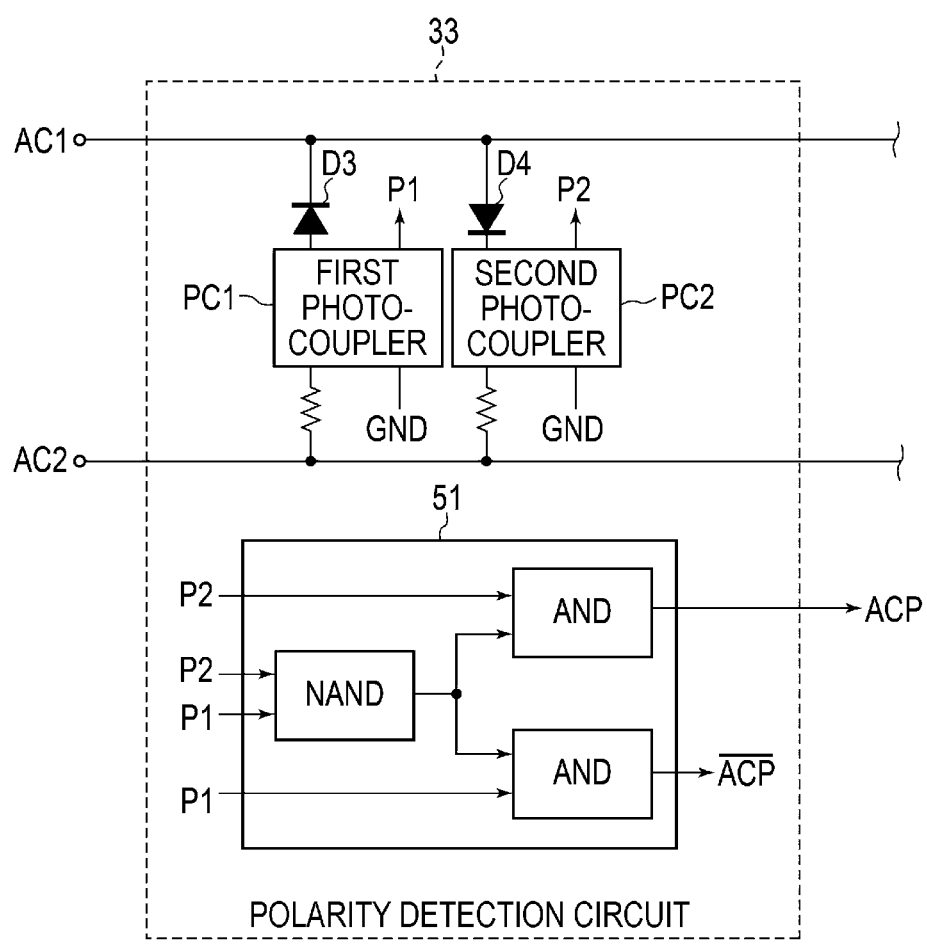
FIG. 8 is a diagram for explaining an example of another configuration of a polarity detection circuit according to an embodiment.

When the polarity detection circuit 33 is configured as an analog circuit, for example, the configuration is as shown in FIG. 8. In the example of FIG. 8, the polarity detection circuit 33 is provided outside the control circuit 16, and outputs the signal ACP to the first selector 37 and the second selector 40 of the control circuit 16. The polarity detection circuit 33 includes a third diode D3, a fourth diode D4, a first photocoupler PC1, a second photocoupler PC2, and a logic circuit 51, for example.

The third diode D3 includes a cathode connected to the first terminal AC1 of the filter circuit 11, and an anode connected to the cathode of the first photocoupler PC1. The first photocoupler PC1 includes an anode connected to the second terminal AC2 of the filter circuit 11 through a resistor, a collector connected to the GND, and an emitter connected to the logic circuit 51.

The fourth diode D4 includes an anode connected to the first terminal AC1 of the filter circuit 11, and a cathode connected to the anode of the second photocoupler PC2. The second photocoupler PC2 includes a cathode connected to the second terminal AC2 of the filter circuit 11 through a resistor, a collector connected to the GND, and an emitter connected to the logic circuit 51.

According to the configuration described above, when AC1<AC2, a current flows from the anode to the cathode, and the first photocoupler PC1 outputs the signal P1 to the logic circuit 51. When AC1>AC2, a current flows from the anode to the cathode, and the second photocoupler PC2 outputs the signal P2 to the logic circuit 51.

The logic circuit 51 outputs the signal ACP indicating "1" while the signal P2 is supplied from the second photocoupler PC2, and outputs the signal ACP indicating "0" while the signal P1 is supplied from the first photocoupler PC1. For example, the logic circuit 51 includes one NAND and two ANDs. The signal P1 and the signal P2 are input to the NAND. The output of the NAND and the signal P2 are input to the first AND. The output of the NAND and the signal P1 are input to the second AND.

According to this configuration, the first AND outputs "1" when the signal P2 is input and the signal P1 is not input. The first AND outputs "0" when the signal P2 is not input and the signal P1 is input. That is, the output of the first AND is supplied, as a signal ACP, to the first selector 37 and the second selector 40 of the control circuit 16. In addition, the second AND outputs "1" when the signal P2 is not input and the signal P1 is input. The second AND outputs "0" when the signal P2 is input and the signal P1 is not input. That is, the output of the second AND is the inverse of the signal ACP.

Further, other circuits of the control circuit 16 may be realized by a logic circuit or a combination of a processor and a program instead of an analog circuit.

For example, the first comparator 32 and the second comparator 38 may be configured to convert each of the two input signals into digital signals using AD conversion or the like, and calculate a difference with a digital value. The first comparator 32 and the second comparator 38 are realized by the following codes, for example.

```
Sout = f (Sin1, Sin2)
{
Sout = Sin1 – Sin2;
}
```

In addition, the multiplier 36 may be configured to convert each of the two input signals into digital signals using AD conversion or the like, and perform multiplication with a digital value. The multiplier 36 is realized by the following code, for example.

```
MUL = f(Sin1, Sin2)
{
MUL = Sin1 * Sin2;
}
```

As described above, in an example realized by a combination of a processor and a program, the input signals are converted into digital signals using AD conversion or the like, and the arithmetic operation is performed based on the digital value. Further, when the circuit at the subsequent stage is an analog circuit, the digital signal may be converted into an analog signal using a DA conversion or the like to be output.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power converter, comprising:
a totem-pole power factor correction circuit comprising a coil connected to a first terminal of an AC power supply, a first half-wave switch comprising a source terminal connected to the coil, a second half-wave switch comprising a drain terminal connected to the source terminal of the first half-wave switch, a first diode comprising a cathode connected to a drain terminal of the first half-wave switch and an anode connected to a second terminal of the AC power supply, a second diode comprising an anode connected to a source terminal of the second half-wave switch and a cathode connected to the second terminal of the AC power supply, and a smoothing capacitor positioned between the cathode of the first diode and the anode of the second diode;
a series connection of a first current detector and a second current detector positioned between the anode of the first diode and the cathode of the second diode, and the second terminal of the AC power supply; and
a control circuit that performs a pulse width control for turning on and off the first half-wave switch and the second half-wave switch based on a detection result of current by the first current detector or a detection result of current by the second current detector,
wherein the control circuit converts a voltage across the smoothing capacitor into a voltage referenced to a GND voltage which is a voltage at a connection point between the first current detector and the second current detector, and performs the pulse width control based on the converted voltage.

2. The power converter according to claim 1,
wherein the control circuit comprises a polarity detection circuit that detects a polarity of an AC voltage supplied from the AC power supply based on a GND voltage that is a voltage at a connection point between the first current detector and the second current detector, and switches a switch for performing the pulse width control, between the first half-wave switch and the second half-wave switch, based on a detection result of the polarity detection circuit.

3. The power converter according to claim 2,
wherein the control circuit switches a detection result of current to be used for the pulse width control, between the detection result of current by the first current detector and the detection result of current by the second current detector, based on the detection result of the polarity detection circuit.

4. The power converter according to claim 1,
wherein the control circuit turns on and off the second half-wave switch based on the detection result of current by the first current detector when the first terminal of the AC power supply has a positive potential, and turns on and off the first half-wave switch based on the detection result of current by the second current detector when the second terminal of the AC power supply has a positive potential.

5. The power converter according to claim 1,
wherein the control circuit turns on the first half-wave switch while the first terminal of the AC power supply has a positive potential and while the second half-wave switch is turned off, and turns on the second half-wave switch while the second terminal of the AC power supply has a positive potential and while the first half-wave switch is turned off.

6. The power converter according to claim 1,
wherein the first diode is a body diode of a FET that is turned on while the first terminal of the AC power supply has a positive potential, and turned off while the second terminal of the AC power supply has a positive potential, and the second diode is a body diode of a FET that is turned off while the first terminal of the AC power supply has a positive potential, and turned on while the second terminal of the AC power supply has a positive potential.

7. A power conversion method, comprising:
performing pulse width control for turning on and off a first half-wave switch and a second half-wave switch based on a detection result of current by a first current detector or a detection result of current by a second current detector using a totem-pole power factor correction circuit comprising a coil connected to a first terminal of an AC power supply, the first half-wave switch comprising a source terminal connected to the coil, the second half-wave switch comprising a drain terminal connected to the source terminal of the first half-wave switch, a first diode comprising a cathode connected to a drain terminal of the first half-wave switch and an anode connected to a second terminal of the AC power supply, a second diode comprising an anode connected to a source terminal of the second half-wave switch and a cathode connected to the second terminal of the AC power supply, and a smoothing capacitor positioned between the cathode of the first diode and the anode of the second diode, a series connection of the first current detector and the second current detector positioned between the anode of the first diode and the cathode of the second diode, and the second terminal of the AC power supply;

converting a voltage across the smoothing capacitor into a voltage referenced to a GND voltage which is a voltage at a connection point between the first current detector and the second current detector; and performing the pulse width control based on the converted voltage.

8. The power conversion method according to claim 7, further comprising:

detecting a polarity of an AC voltage supplied from the AC power supply based on a GND voltage that is a voltage at a connection point between the first current detector and the second current detector; and switching a switch for performing the pulse width control, between the first half-wave switch and the second half-wave switch, based on a detection result of a polarity detection circuit.

9. The power conversion method according to claim 8, further comprising:

switching a detection result of current to be used for the pulse width control, between the detection result of current by the first current detector and the detection result of current by the second current detector, based on the detection result of the polarity detection circuit.

10. The power conversion method according to claim 7, further comprising:

turning on and off the second half-wave switch based on the detection result of current by the first current detector when the first terminal of the AC power supply has a positive potential; and turning on and off the first half-wave switch based on the detection result of current by the second current detector when the second terminal of the AC power supply has a positive potential.

11. The power conversion method according to claim 7, further comprising:

turning on the first half-wave switch while the first terminal of the AC power supply has a positive potential and while the second half-wave switch is turned off; and turning on the second half-wave switch while the second terminal of the AC power supply has a positive potential and while the first half-wave switch is turned off.

12. An AC to DC power converter, comprising:

a totem-pole power factor correction circuit comprising a coil connected to a first terminal of an AC power supply, a first half-wave switch comprising a source terminal connected to the coil, a second half-wave switch comprising a drain terminal connected to the source terminal of the first half-wave switch, a first diode comprising a cathode connected to a drain terminal of the first half-wave switch and an anode connected to a second terminal of the AC power supply, a second diode comprising an anode connected to a source terminal of the second half-wave switch and a cathode connected to the second terminal of the AC power supply, and a smoothing capacitor positioned between the cathode of the first diode and the anode of the second diode;

a series connection of a first current detector and a second current detector positioned between the anode of the first diode and the cathode of the second diode, and the second terminal of the AC power supply; and a control circuit that performs a pulse width control for turning on and off the first half-wave switch and the second half-wave switch based on a detection result of current by the first current detector or a detection result of current by the second current detector, wherein the control circuit converts a voltage across the smoothing capacitor into a voltage referenced to a GND voltage which is a voltage at a connection point between the first current detector and the second current detector, and performs the pulse width control based on the converted voltage.

13. The AC to DC power converter according to claim 12, wherein the control circuit comprises a polarity detection circuit that detects a polarity of an AC voltage supplied from the AC power supply based on a GND voltage that is a voltage at a connection point between the first current detector and the second current detector, and switches a switch for performing the pulse width control, between the first half-wave switch and the second half-wave switch, based on a detection result of the polarity detection circuit.

14. The AC to DC power converter according to claim 13, wherein the control circuit switches a detection result of current to be used for the pulse width control, between the detection result of current by the first current detector and the detection result of current by the second current detector, based on the detection result of the polarity detection circuit.

15. The AC to DC power converter according to claim 13, wherein the control circuit turns on and off the second half-wave switch based on the detection result of current by the first current detector when the first terminal of the AC power supply has a positive potential, and turns on and off the first half-wave switch based on the detection result of current by the second current detector when the second terminal of the AC power supply has a positive potential.

16. The AC to DC power converter according to claim 12, wherein the control circuit turns on the first half-wave switch while the first terminal of the AC power supply has a positive potential and while the second half-wave switch is turned off, and turns on the second half-wave switch while the second terminal of the AC power supply has a positive potential and while the first half-wave switch is turned off.

17. The AC to DC power converter according to claim 12, wherein the first diode is a body diode of a FET that is turned on while the first terminal of the AC power supply has a positive potential, and turned off while the second terminal of the AC power supply has a positive potential, and the second diode is a body diode of a FET that is turned off while the first terminal of the AC power supply has a positive potential, and turned on while the second terminal of the AC power supply has a positive potential.

* * * * *